United States Patent
Slone

(10) Patent No.: US 6,403,703 B1
(45) Date of Patent: Jun. 11, 2002

(54) POLYMERIC COMPOSITIONS FROM ACRYLIC AND UNSATURATED CARBOXYL MONOMERS

(75) Inventor: Robert V. Slone, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 200 days.

(21) Appl. No.: 09/610,686

(22) Filed: Jul. 7, 2000

Related U.S. Application Data

(60) Provisional application No. 60/151,097, filed on Aug. 27, 1999.

(51) Int. Cl.$^7$ .................................................. C08F 2/16
(52) U.S. Cl. ...................... 524/832; 524/833; 526/81; 526/84
(58) Field of Search ................... 524/832, 833; 526/81, 84, 318.4, 318.44

(56) References Cited

U.S. PATENT DOCUMENTS

| | | | |
|---|---|---|---|
| 4,301,264 A | | 11/1981 | Moore et al. ................. 526/86 |
| 5,298,542 A | * | 3/1994 | Nakamura .................. 524/297 |
| 5,540,987 A | | 7/1996 | Mudge et al. ............... 428/288 |
| 5,637,646 A | | 6/1997 | Ellis ........................... 525/309 |
| 5,753,746 A | | 5/1998 | Rupaner et al. ............. 524/555 |
| 5,986,011 A | * | 11/1999 | Ellis ........................... 525/309 |

FOREIGN PATENT DOCUMENTS

| | | |
|---|---|---|
| JP | SHO 58-91707 | 5/1983 |

OTHER PUBLICATIONS

Polymer 40 (1999) 1395–1401, "Initiation mechanisms for radical polymerization of styrene and methyl methacrylate with highly substituted peroxypivalate initiators", author Tomoyuki Nakamura et al.

Macromolecules 1996, 29, 8975–8576, "Advantage of Using tert–Hexyl Peroxypivalate as an initiator for the Polymerization of Methyl Methacrylate", author Tomoyuki Nakamura et al.

Journal of Coatings Technology, "Initiators for Water–Based Acrylate Emulsion Polymerization"; author Lea L. Anderson and Wilfried M. Brouwer; vol. 68, No. 855, Apr. '96.

Presented at the Water–Borne, Higher–Solids and Powder Coatings Symposium 2/26–Feb. 28, 1992; New Orleans, LA; "The Dominant Role of Organic Peroxide Initiators in Acrylic HSC Resin Synthesis and Properties", author Peter A. Callais, et al.

* cited by examiner

*Primary Examiner*—Christopher Henderson
(74) *Attorney, Agent, or Firm*—Ronald D. Bakule

(57) ABSTRACT

An aqueous composition suitable for use, when dry, as an improved elastomeric coating, caulk, sealant, or pressure sensitive adhesive is provided including a predominantly acrylic aqueous emulsion polymer, the polymer having a glass transition temperature (Tg) from −90° C. to 20° C., formed by the free radical polymerization of at least one ethylenically unsaturated nonionic acrylic monomer and 0.5–5%, by weight based on the total weight of said polymer, ethylenically unsaturated carboxylic acid monomer until 90–99.7% of said monomers by weight, based on the total weight of said polymer, has been converted to polymer and subsequently at least half of the remaining monomer is converted to polymer in the presence of 0.1–1.0 wt %, by weight based on the total weight of said polymer, t-amyl hydroperoxide. A method for preparing the emulsion polymer, a method for coating a substrate to provide an elastomeric coating on a substrate, a method for applying an aqueous caulk or sealant composition to a substrate, and a method for providing a pressure sensitive adhesive on a substrate are also provided.

4 Claims, No Drawings

POLYMERIC COMPOSITIONS FROM ACRYLIC AND UNSATURATED CARBOXYL MONOMERS

This application claims priority from Provisional application Ser. No. 60/151,097, filed Aug. 27, 1999.

This invention relates to an aqueous composition suitable for use when dry as an improved elastomeric coating, caulk, sealant or pressure sensitive adhesive, a method for preparing an aqueous emulsion polymer suitable for use as an improved elastomeric coating, caulk, sealant or pressure sensitive adhesive, and a methods for providing an improved elastomeric coating, caulk or sealant, or pressure sensitive adhesive. More particularly this invention relates to an aqueous composition suitable for use when dry as an improved elastomeric coating, caulk, sealant or pressure sensitive adhesive including a predominantly acrylic aqueous emulsion polymer, the polymer having a glass transition temperature (Tg) from −90° C. to 20° C., the polymer formed by the free radical polymerization of at least one ethylenically unsaturated nonionic acrylic monomer and 0.5–5%, by weight based on the total weight of the polymer, ethylenically unsaturated carboxylic acid monomer, until 90–99.7% of the monomers by weight, based on the total weight of the polymer, has been converted to polymer; and the subsequent polymerization at least half, by weight, of the remaining monomer to polymer in the presence of 0.1–1.0%, by weight based on the total weight of the polymer, t-amyl hydroperoxide.

The present invention serves to provide an aqueous composition suitable for use when dry as an improved elastomeric coating, caulk, or sealant so as to retain its integrity without cracking under stress even at temperatures below 0 C. Elastomeric coatings, caulks, and sealants are frequently applied to buildings and other constructions subjected to outdoor temperature extremes and desirably retain their integrity under such conditions. Also, the present serves to provide an aqueous composition suitable for use when dry as an improved pressure sensitive adhesive having improved tack which may be desirable in itself or, alternatively, provide the basis for ehancement of other adhesive properties such as peel or shear strength with retention of useful levels of tack.

U.S. Pat. No. 5,540,987 discloses emulsion polymers having low residual formaldehyde and providing saturated cellulosic webs having improved tensile strength. The polymers are formed by the use of an hydrophobic hydroperoxide and ascorbic acid initiator throughout the course of the reaction.

The problem faced by the inventors is the provision of an aqueous composition suitable for use when dry as an improved elastomeric coating, caulk, sealant or pressure sensitive adhesive. Unexpectedly, the inventors found that the use of t-amyl hydroperoxide in the last stages of the polymerization was sufficient to provide polymers which led improved elastomeric coating, caulk, sealant or pressure sensitive adhesives.

In a first aspect of the present invention there is provided an aqueous composition suitable for use when dry as an improved elastomeric coating, caulk, sealant or pressure sensitive adhesive including a predominantly acrylic aqueous emulsion polymer, the polymer having a glass transition temperature (Tg) from −90° C. to 20° C., formed by the free radical polymerization of at least one ethylenically unsaturated nonionic acrylic monomer and 0.5–5%, by weight based on the total weight of the polymer, ethylenically unsaturated carboxylic acid monomer until 90–99.7% of the monomers by weight, based on the total weight of the polymer, has been converted to polymer and subsequently at least half of the remaining monomer is converted to polymer in the presence of 0.1–1.0%, by weight based on the total weight of the polymer, t-amyl hydroperoxide.

In a second aspect of the present invention there is provided a method for preparing an aqueous emulsion polymer suitable for use in an improved elastomeric coating, caulk, sealant or pressure sensitive adhesive including forming a predominantly acrylic aqueous emulsion polymer, the polymer having a glass transition temperature (Tg) from −90° C. to 20° C., by the free radical polymerization of at least one ethylenically unsaturated nonionic acrylic monomer and 0.5–5%, by weight based on the total weight of the polymer, ethylenically unsaturated carboxylic acid monomer until 90–99.7% of the monomers by weight, based on the total weight of the polymer, has been converted to polymer; and subsequently polymerizing at least half of the remaining monomer to polymer in the presence of 0.1–1.0%, by weight based on the total weight of said polymer, t-amyl hydroperoxide.

In a third aspect of the present invention there is provided a method for coating a substrate with an aqueous composition to provide an elastomeric coating on a substrate. In a fourth aspect of the present invention there is provided a method for applying an aqueous caulk or sealant composition to a substrate. In a fifth aspect of the present invention there is provided a method for providing a pressure sensitive adhesive on a substrate.

This invention relates to an aqueous composition suitable for use when dry as an elastomeric coating having improved low temperature elongation including a predominantly acrylic aqueous emulsion polymer, the polymer having a glass transition temperature (Tg) from −90° C. to 20° C., formed by the free radical polymerization of at least one ethylenically unsaturated nonionic acrylic monomer and 0.5–5%, by weight based on the total weight of the polymer, ethylenically unsaturated carboxylic acid monomer until 90–99.7% of the monomers by weight, based on the total weight of the polymer, has been converted to polymer and subsequently at least half of the remaining monomer is converted to polymer in the presence of 0.1–1.0%, by weight based on the total weight of the polymer, t-amyl hydroperoxide.

The predominantly acrylic aqueous emulsion polymer contains at least one copolymerized ethylenically unsaturated nonionic acrylic monomer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid. The use of the term "(meth)" followed by another term such as acrylate or acrylamide, as used throughout the disclosure, refers to both acrylates or acrylamides and methacrylates and methacrylamides, respectively. By "nonionic monomer" herein is meant that the copolymerized monomer residue does not bear an ionic charge between pH=1–14.

The ethylenically unsaturated nonionic acrylic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate. Other ethylenically unsaturated nonionic monomers which may be incorporated into the polymer with the proviso that the polymer must be predominantly acrylic in composition include, for example, styrene and substituted styrenes; butadiene; vinyl acetate, vinyl butyrate and other vinyl esters; and vinyl monomers such as vinyl chloride, vinylidene chloride. Preferred are all-acrylic, styrene/acrylic, and vinyl acertate/acrylic polymers.

The emulsion polymer contains from 0.5% to 5%, by weight based on total monomer weight, of a copolymerized monoethylenically-unsaturated carboxylic acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, and maleic anhydride.

The emulsion polymer used in this invention may contain from 0% to 1%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg") of the emulsion polymer is from −90° C. to 20° C., as measured by differential scanning calorimetry (DSC) taking the mid-point in the heat flow versus temperature transition as the Tg value, the monomers and amounts of the monomers being selected to achieve the desired polymer Tg range as is well known in the art. Preferred Tg of the emulsion polymer for elastomeric wall coatings is from −40° C. to 20° C.; of caulks and sealants is −60° C. to 20° C.; of pressure sensitive adhesives is −90° C. to 0° C.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 100° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period, or combinations thereof.

Conventional free radical initiators may be used such as, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiators coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. However, after 90–99.7%, preferably 95–99.7%, of the monomers by weight, based on the total weight of the polymer, have been converted to polymer, at least half of the remaining monomer is converted to polymer in the presence of 0.1–1.0%, by weight based on the total weight of the polymer, of t-amyl hydroperoxide. This part of the reaction may be effected as soon as 90–99.7%, preferably 95–99.7%, conversion of the monomers to polymer is completed in the same reaction vessel or kettle. It may be effected after a period of time, in a different reaction vessel or kettle, or at a different temperature than the preceding part of the polymerization. Preferred is the presence of t-amyl hydroperoxide only after 90%, more preferably after 95%, conversion of the monomers to polymer is completed.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The average particle diameter of the emulsion-polymerized polymer particles is preferred to be from 30 nanometers to 500 nanometers, as measured by a BI-90 Particle Sizer.

The aqueous composition is prepared by techniques which are well known in the coatings art. First, if the elastomeric coating, caulk, sealant or pressure sensitive adhesive composition is to be pigmented, at least one pigment is well dispersed in an aqueous medium under high shear such as is afforded by a COWLES® mixer or, for more viscous compositions such as caulks and sealants, a high intensity mixer or mill. Then the waterborne polymer is added under lower shear stirring along with other elastomeric coating, caulk, sealant or pressure sensitive adhesive adjuvants as desired. Alternatively, the aqueous emulsion polymer may be included in the pigment dispersion step. The aqueous composition may contain conventional elastomeric coating, caulk, sealant or pressure sensitive adhesive adjuvants such as, for example, tackifiers, pigments, emulsifiers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The aqueous composition may applied by conventional application methods such as, for example, brushing and spraying methods such as, for example, roll coating, doctor-blade application, printing methods, air-atomized spray, air-assisted spray, airless spray, high volume low pressure spray, air-assisted airless spray, caulk guns, and trowels.

The aqueous composition may be applied to a substrate such as, for example, plastic including sheets and films, wood, metal, previously painted surfaces, cementitious substrates, asphaltic substrates or the like, with or without a prior substrate treatment such as an acid etch or corona discharge or a primer.

The aqueous composition coated on the substrate is typically dried, or allowed to dry, at a temperature from 20° C. to 95° C.

The following examples are presented to illustrate the invention and the results obtained by the test procedures.

Abbreviations
AA=acrylic acid
BA=butyl acrylate
MMA=methyl methacrylate
AN=acrylonitrile
EHA=2-ethylhexyl acrylate
DI water=deionized water

EXAMPLE 1 AND COMPARATIVE EXAMPLE A

Preparation of Predominantly Acrylic Emulsion Polymers

Polymerization was carried out in a 3 liter, four-neck, round bottom glass flask equipped with a mechanical blade stirrer, a thermocouple to monitor temperature, a reflux condenser, a means to heat and cool, and a nitrogen atmosphere. The flask was charged with 400 g DI water and heated to 83° C. A monomer pre-emulsion was prepared from 280 g DI water, 11 g sodium dodecylbenzene sulfonate (23% aqueous solution), 885 g BA, 100 g MMA and 15 g AA. The reaction flask was charged with 4 g of ammonium persulfate dissolved in 20 g DI water and 16 g (solids basis) of a 100 nm seed latex with a total of 29 g of DI water. The remaining pre-emulsion and 1.5 g ammonium persulfate dissolved in 45 g DI water were added over three hours. Heating and cooling were applied as necessary to maintain the reaction temperature at 83° C. When the additions were complete, 30 g DI water was used to rinse the pre-emulsion container into the flask. After 30 minutes, the flask was cooled to 60° C. A sample was taken, analyzed by gas chromatography and the monomer conversion to polymer was found to be 99.62 wt. %. The contents of the reaction flask were divided equally between two three-liter glass flasks equipped as described above. Both flasks were maintained at 55° C.

For Example 1, 0.008 g of $FeSO_4.7H_2O$ dissolved in 5 g DI water was added, followed by 3.0 g of 85% aqueous tert-amyl hydroperoxide dissolved in 45 g DI water and 2.3 g of sodium formaldehyde sulfoxylate dissolved in 45 g DI water added drop-wise over one hour. The reaction mixture was cooled to 45° C. and the pH adjusted with 14 g of 14% aqueous ammonia. After cooling to room temperature the emulsion polymer was filtered. The emulsion polymer of Example 1 had a solids content of 49.3% by weight (wt %), particle size of 360 nm and a pH of 8.1. Monomer conversion to polymer was analyzed by gas chromatography and found to be greater than 99.99 wt %.

For Comparative Example A, 0.008 g $FeSO_4.7H_2O$ dissolved in 5 g DI water was added, followed by 3.0 g of 70% aqueous tert-butyl hydroperoxide dissolved in 45 g DI water and 2.3 g sodium formaldehyde sulfoxylate dissolved in 45 g DI water added drop-wise over one hour. The reaction mixture was cooled to 45° C. and the pH adjusted with 14 g of 14% aqueous ammonia. After cooling to room temperature the emulsion polymer was filtered. Comparative Example had a solids content of 49.5 wt %, particle size of 360 nm and pH of 8.2. Monomer conversion to polymer was analyzed by gas chromatography and found to be greater than 99.99 wt %.

EXAMPLE 2 AND COMPARATIVE EXAMPLE B

Preparation of Predominantly Acrylic Emulsion Polymers

Example 2 and Comparative Example B were prepared in the same manner as Example 1 and Comparative Example A, respectively, except that the polymer composition was 91.5 BA/7 AN/1.5 AA, by weight. At the end of the first (common) stage of the reaction a sample was taken, analyzed by gas chromatography and the monomer conversion to polymer was found to be 98.02 wt. %.

For Example 2, 0.008 g $FeSO_4.7H_2O$ dissolved in 5 g DI water was added, followed by 3.0 g 85% aqueous tert-amyl hydroperoxide dissolved in 45 g DI water and 2.3 g sodium formaldehyde sulfoxylate dissolved in 45 g DI water added drop-wise over one hour. The reaction mixture was cooled to 45° C. and the pH adjusted with 14 g of 14% aqueous ammonia. After cooling to room temperature the emulsion polymer was filtered. The emulsion polymer of Example 2 had a solids content of 49.6 wt %, particle size of 370 nm and a pH of 8.6. Monomer conversion to polymer was analyzed by gas chromatography and found to be greater than 99.99 wt %.

For Comparative Example B, 0.008 g $FeSO_4.7H_2O$ dissolved in 5 g DI water was added, followed by 3.0 g of 70% aqueous tert-butyl hydroperoxide dissolved in 45 g DI water and 2.3 g sodium formaldehyde sulfoxylate dissolved in 45 g DI water added drop-wise over one hour. The reaction mixture was cooled to 45° C. and the pH adjusted with 14 g of 14% aqueous ammonia. After cooling to room temperature the emulsion polymer was filtered. Comparative Example had a solids content of 49.8 wt %, particle size of 370 nm and pH of 8.1. Monomer conversion to polymer was analyzed by gas chromatography and found to be greater than 99.99 wt %.

EXAMPLE 3 AND COMPARATIVE EXAMPLE C

Preparation of Predominantly Acrylic Emulsion Polymers

Comparative Example C was synthesized via the following method: To an empty reactor was added 389.75 g DI water, 8.30 g polymeric seed, and 4.00 g ferrous sulfate (0.15% aqueous), and 3.71 g tert-butylhydroperoxide (70% aqueous) with 52.00 g DI water. A monomer emulsion containing 120.00 g DI water, 36.90 g Sodium Dodecylbenzenesulfonate surfactant, 552.00 g BA, 187.50 g ERA, and 10.50 g AA was formed. The reactor contents were heated to 65° C. prior to addition of the oxidant solution. The monomer emulsion was fed into the kettle simultaneously with a separate reductant solution consisting of 2.22 g Sodium sulfoxylate formaldehyde in 52.00 g DI water such that a temperature of 65° C. was maintained by the polymerization and the application of external heat. Upon completion of the monomer emulsion and initiator feeds conversion of monomer to polymer was 95.5% by weight. Then a redox chaser system consisting of 3.71 g tert-butylhydroperoxide (70% aqueous) dissolved in 52.00 g DI water and 2.22 g Sodium sulfoxylate formaldehyde in 52.00 g DI water was prepared. The oxidant solution was added all at once, and the reductant was fed into the reactor. After the reductant addition was completed, the reactor temperature was then lowered to below 45° C. The final polymer contained 69 ppm residual monomer. The pH of the batch was raised to 7.5 using ammonium hydroxide (28% aqueous) and the sample was then filtered through a 100 mesh screen.

Example 3 was synthesized with as was Comparative Example C except that the conversion of monomer to polymer after the monomer emulsion and initiator feeds were completed was 96.3% by weight. The chaser oxidant employed was 3.53 g t-Amylhydroperoxide (85% in t-Amyl alcohol) added all at once with 52.00 g DI water. The final polymer contained 155 ppm residual monomer.

EXAMPLE 4

Preparation of Aqueous Compositions and Evaluation of Elastomeric Coatings

Aqueous compositions were made using the following ingredients, added in the order given.:

| Ingredients | Amount (g) |
|---|---|
| Water | 106.77 |
| Tamol 731[1] | 12.28 |
| Potassium tripolyphosphate | 3.1 |
| Nopco NXZ[2] | 7.2 |
| Acrysol RM 8W[1] | 17.7 |
| Propylene Glycol | 20.0 |
| Tioxide TR-92[3] | 100.0 |
| Durcal 5[4] | 447.3 |
| Butyl Carbitol[5] | 13.6 |

The ingredients were mixed using a high shear Cowles mixer and one of the following amounts of emulsion polymer was added with stirring.

| Emulsion Polymer | Weight (g) |
|---|---|
| Example 1 | 502.5 |
| Comparative Example A | 500.9 |
| Example 2 | 497.4 |
| Comparative Example B | 495.5 |

[1]Trademark of Rohm and Haas Company.
[2]Trademark of Diamond Shamrock Chemical Company.
[3]Trademark of Tioxide Europe Ltd.
[4]Trademark of OMYA, Inc.
[5]Trademark of Union Carbide Chemical Co, The aqueous compositions were coated at equal volume on release paper at 1 mm wet thickness and dried for 23 days (at 25° C. and 50% relative humidity). Dumbbell shaped specimens having a neck width of 10 mm and a neck length of 30 mm were cut out. The thickness of each sample was measured at its neck with a micrometer. Elongation was determined using the Tinius Olsen UTM (Model No. H10K-S, Tinius Olsen Testing Machine Co., Inc., Willow Grove, Pa.). The controlled temperature chamber was set at −10° C. The separation speed was set at 5.08 cm/min (2 inch/min).

| Elastomeric Coating containing Emulsion Polymer of | Low Temperature Elongation at Break |
|---|---|
| Example 1 | 569 |
| Comparative Example A | 416 |
| Example 2 | 249 |
| Comparative Example B | 235 |

Elastomeric coatings containing emulsion polymers Examples 1 and 2 of the invention exhibit higher low temperature elongation at break relative to the corresponding comparative samples.

EXAMPLE 5

Evaluation of Aqueous Compositions as Pressure Sensitive Adhesives

Dried films of the emulsion polymers of Example 3 and of Comparative Example C were tested according to the following methods.

Peel: PSTC-1 Peel Adhesion of Single Coated Pressure Sensitive Tapes at 180° Angle (PSTC=Pressure Senstitive Tape Council, 401 N. Michigan Avenue, #00, Chicago, Ill. 60611), adhesive applied to stainless steel.

Loop Tack: ASTM D6195 Standard Test Methods for Loop Tack

Shear: ASTM D6463 Standard Test Methods for Time to Failure of Pressure Sensitive Articles under Sustained Shear Loading.

TABLE 5.1

Evaluation of pressure sensitive adhesive properties

| Emulsion polymer of Example | redox/chase | 180 peel oz/in | shear, min 1" × 1", 1 kg | shear fail mode | loop tack oz |
|---|---|---|---|---|---|
| Comp. C | tBHP/tBHP | 27.3 | 51 | C | 30.5 A |
| 3 | tBHP/tAHP 50C/50A | 34.0 C | 3 | C | 56.5 A |

The pressure sensitive adhesive, dried emulsion polymer of Example 3, of this invention exhibited improved tack relative to that of Comparative Example C.

What is claimed is:

1. An aqueous composition suitable for use when dry as an improved elastomeric coating, caulk, sealant or pressure sensitive adhesive comprising a predominantly acrylic aqueous emulsion polymer, said polymer having a glass transition temperature (Tg) from −90° C. to 20° C., formed by the free radical polymerization of at least one ethylenically unsaturated nonionic acrylic monomer and 0.5–5%, by weight based on the total weight of said polymer, ethylenically unsaturated carboxylic acid monomer until 90–99.7% of said monomers by weight, based on the total weight of said polymer, has been converted to polymer and subsequently at least half of the remaining monomer is converted to polymer in the presence of 0.1–1.0 wt %, by weight based on the total weight of said polymer, t-amyl hydroperoxide.

2. The aqueous composition of claim 1 wherein t-amyl hydroperoxide is present only after 90% of said monomers by weight, based on the total weight of said polymer, has been converted to polymer.

3. A method for preparing an aqueous emulsion polymer suitable for use in an improved elastomeric coating, caulk, sealant or pressure sensitive adhesive comprising forming a predominantly acrylic aqueous emulsion polymer, said polymer having a glass transition temperature (Tg) from −90° C. to 20° C., by the free radical polymerization of at least one ethylenically unsaturated nonionic acrylic monomer and 0.5–5%, by weight based on the total weight of said polymer, ethylenically unsaturated carboxylic acid monomer until 90–99.7% of said monomers by weight, based on the total weight of said polymer, has been converted to polymer; and subsequently polymerizing at least half of the remaining monomer to polymer in the presence of 0.1–1.0%, by weight based on the total weight of said polymer, t-amyl hydroperoxide.

4. The method of claim 3 wherein t-amyl hydroperoxide is present only after 90% of said monomers by weight, based on the total weight of said polymer, has been converted to polymer.

* * * * *